United States Patent [19]
Fujimura

[11] Patent Number: 4,740,328
[45] Date of Patent: Apr. 26, 1988

[54] LIQUID CRYSTAL COMPOSITION

[75] Inventor: Koh Fujimura, Tokyo, Japan

[73] Assignee: Casio Computer Co., Ltd., Tokyo, Japan

[21] Appl. No.: 10,862

[22] Filed: Feb. 4, 1987

[30] Foreign Application Priority Data

Feb. 14, 1986 [JP] Japan ................... 61-30153

[51] Int. Cl.$^4$ .................. G02F 1/13; C09K 19/30
[52] U.S. Cl. ................ 252/299.63; 252/299.01; 252/299.5; 350/346; 350/350 R
[58] Field of Search ........... 350/346, 350 R, 350 S; 252/299.5, 299.01, 299.63

[56] References Cited

U.S. PATENT DOCUMENTS

| | | | |
|---|---|---|---|
| 4,279,770 | 7/1981 | Inukai et al. ............ | 252/299.63 |
| 4,387,038 | 6/1983 | Fukui et al. ............. | 252/299.63 |
| 4,387,039 | 6/1983 | Sugimori et al. ......... | 252/299.63 |
| 4,399,298 | 8/1983 | Sugimori et al. ......... | 252/299.63 |
| 4,460,770 | 7/1984 | Petrzilka et al. ......... | 252/299.63 |
| 4,550,981 | 11/1985 | Petrzilka et al. ......... | 252/299.63 |
| 4,559,161 | 12/1985 | Takei et al. ............ | 252/299.63 |
| 4,566,759 | 1/1986 | McDonnell et al. ...... | 252/299.63 |
| 4,609,256 | 9/1986 | Nakamura ............. | 252/299.01 |
| 4,652,089 | 3/1987 | Oesterhelt et al. ....... | 252/299.63 |

FOREIGN PATENT DOCUMENTS

| | | | |
|---|---|---|---|
| 107116 | 5/1984 | European Pat. Off. ..... | 252/299.63 |
| 171746 | 2/1986 | European Pat. Off. ..... | 252/299.63 |
| 55-84385 | 6/1980 | Japan ................... | 252/299.64 |
| 57-5780 | 1/1982 | Japan ................... | 252/299.63 |
| 57-5782 | 1/1982 | Japan ................... | 252/299.63 |
| 57-64645 | 4/1982 | Japan ................... | 252/299.63 |
| 57-83577 | 5/1982 | Japan ................... | 252/299.63 |
| 58-118886 | 7/1983 | Japan ................... | 252/299.63 |
| 58-142966 | 8/1983 | Japan ................... | 252/299.63 |
| 58-142959 | 8/1983 | Japan ................... | 252/299.63 |
| 60-135479 | 7/1985 | Japan ................... | 252/299.63 |
| 61-171790 | 8/1986 | Japan ................... | 252/299.63 |
| 61-221286 | 10/1986 | Japan ................... | 252/299.63 |

OTHER PUBLICATIONS

Hubbard, R. L., et al., Liquid Crystals and Ordered Fluids, vol. 4, Ed. Griffin, A., et al., Plenum Press, N.Y., pp. 781-798 (1984).

*Primary Examiner*—Teddy S. Gron
*Attorney, Agent, or Firm*—Frishauf, Holtz, Goodman & Woodward

[57] ABSTRACT

A liquid crystal composition contains at a predetermined mixing ratio: a first liquid crystal material of at least one compound represented by general formula (I):

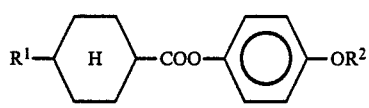

(wherein each of $R^1$ and $R^2$ is independently an alkyl group having 1 to 5 carbon atoms) and a second liquid crystal material of at least a compound represented by general formula (VII) among compounds represented by general formulas (II) to (VII):

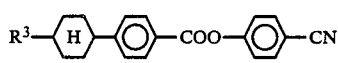

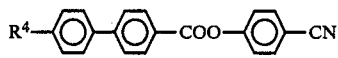

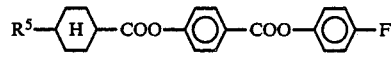

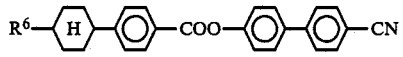

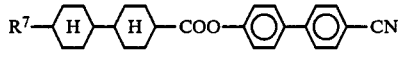

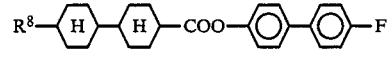

(wherein each of $R^3$, $R^4$, $R^5$, $R^6$, $R^7$, and $R^8$ is independently an alkyl group having 2 to 7 carbon atoms). The liquid crystal composition may optionally contain at least one compound represented by the following general formula:

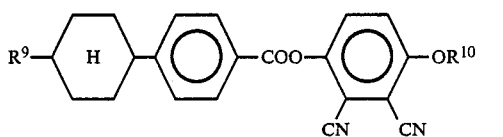

(wherein each of $R^9$ and $R^{10}$ is independently an alkyl group having 2 to 5 carbon atoms).

19 Claims, No Drawings

LIQUID CRYSTAL COMPOSITION

BACKGROUND OF THE INVENTION

1. Field of the Invention

The present invention relates to a liquid crystal composition and, more particularly, to a liquid crystal composition suitably used in a liquid crystal device controlled by two-frequency addressing scheme.

2. Description of the Prior Art

Liquid crystal devices have been used in a variety of applications for television sets, computer terminals, and office equipment. A display device in such equipment is constituted by a liquid crystal display device having a large number of pixels. These pixels are arranged in a matrix form and multiplexing driven. However, when the number of pixels is increased in such a liquid crystal device, the number of scanning lines and hence the number of time-divisional operations are increased. As a result, sufficiently high contrast of the ON and OFF pixels cannot be obtained by a cross effect phenomenon or the like.

A conventional liquid crystal device of this type can also be used in a printer having small optical shutters for controlling light transmission and shielding of liquid crystal elements. In this case, these optical shutters are arranged in a line or a few lines to control light transmission, and characters and images are formed by a large number of small light spots. The size of the optical shutter is very small in such a liquid crystal device (e.g., 0.1 mm$^2$ or less). Characters and images of one page are constituted by a very large number of points. The optical shutters must be driven at very high speed in order to achieve a practical printing speed for printing a 10-page (A4 size) document per minute. However, the conventional driving method cannot sufficiently satisfy such requirements.

Two-frequency addressing scheme utilizing a dielectric dispersion phenomenon is known to solve the above problem. According to this driving technique, a high-frequency (e.g., 100 kHz) signal voltage is applied to a liquid crystal to orient the axes of liquid crystal molecules in a direction perpendicular to an electric field, and a low-frequency (e.g., 200 Hz) signal voltage is applied to the liquid crystal to orient the axes in a direction parallel thereto.

According to the two-frequency addressing scheme, both light-transmitting and light-shielding behaviors of liquid crystal molecules of the liquid crystal device are controlled by the different electric fields, and therefore, the liquid crystal device can be operated at high speed.

A typical example of a display device driven by the two-frequency addressing scheme is disclosed in U.S. Pat. No. 4,236,155. Liquid crystal material compositions used in such display devices are disclosed in Japanese Patent Disclosure (Kokai) No. 58-118886 and U.S. Pat. No. 4,550,981. According to the two-frequency addressing scheme, the liquid crystal device is operated at a relatively high speed, and the cross effect phenomenon can be restricted to improve contrast. However, the liquid crystal composition used in this display device does not have properties which satisfy a high-speed response in the printer.

The liquid crystal shutters in the printers driven by the two-frequency addressing scheme and liquid crystal compositions used in these liquid crystal shutters are disclosed in Japanese Patent Disclosure (Kokai) Nos. 57-83577 and 57-5780 and U.S. Pat. Nos. 4,559,161 and 4,609,256. When the liquid crystal shutters are driven by the two-frequency addressing scheme, they can be operated at a relatively high speed.

Liquid crystal compositions to be applied in liquid crystal devices driven by the two-frequency addressing scheme are disclosed in Japanese Patent Disclosure (Kokai) No. 57-5782, U.S. Pat. Nos. 4,566,759, 4,460,770, and 4,387,038, and GB Patent No. 2085910.

These liquid crystal compositions, however, contain two or three benzene rings and/or cyclohexane rings as their major constituents. These liquid crystal materials have small absolute values of dielectric anisotropy and high cross-over frequency fc for "0" dielectric anisotropy $\Delta\epsilon$. Therefore, the absolute value of dielectric anisotropy is small and/or the cross-over frequency is high Response characteristics of the liquid crystal composition used in the liquid crystal device depend mainly on a value of dielectric anisotropy $\Delta\epsilon$, a viscosity, and an elastic constant of the composition. More specifically, the larger the absolute value of dielectric anisotropy $\Delta\epsilon$ becomes, the quicker the liquid crystal molecules respond. In addition, since the liquid crystal molecules can react in a weak electric field, a low drive voltage can be used. The lower the viscosity becomes, the shorter the response time becomes. The smaller the elastic constant becomes, the shorter the response time becomes.

An RF current can be made small at a low cross-over frequency. For this reason, power consumption can be reduced, and at the same time, dielectric heat generation due to capacitance and Joule heat generation due to resistance in the device can be prevented. In addition, the arrangement of the display driver can be made simple.

However, no existing single liquid crystal compounds satisfy all the conditions described above. A desired liquid crystal material is prepared by mixing different liquid crystal compounds, each having at least one of the desired properties. Various liquid crystal compositions prepared in this manner have the following disadvantages. Even if some compositions have low cross-over frequencies, they have small absolute values of dielectric anisotropy. Even if some compositions have large absolute values of dielectric anisotropy, they have high cross-over frequencies. Even if some liquid crystal compositions have large absolute values of dielectric anisotropy, low cross-over frequencies, and low apparent viscosities, they have large elastic ratios associated with high-speed response. As a result, they are not suitable for high-speed operation.

In order to solve the above problem, the present applicant proposed a liquid crystal composition obtained by mixing a compound having an ester bond and two or three benzene rings and/or cyclohexane rings with a four-ring compound having an ester bond, four benzene rings and/or cyclohexane rings, and a cyano group at the terminal, as described in U.S. Ser. No. 762,615. This liquid crystal composition exhibited a typical dielectric dispersion phenomenon. At the same time, the composition has a large absolute value of dielectric anisotropy, a low viscosity, and a low elastic constant. Therefore, the resultant liquid crystal composition is suitable for a high-speed liquid crystal device. However, the composition has a high cross-over frequency.

A liquid crystal used in a printer or the like has a period of 2 msec or less given to control a light-transmitting state (ON) and a light-shielding state (OFF) of one liquid crystal optical shutter in order to perform printing at a practical speed (e.g., about 10 A4 size sheets per minute). Such an optical shutter must be driven by using an RF electric field having a relatively high frequency, e.g., 100 kHz or more, and preferably 150 kHz or more.

The cross-over frequency changes depending on temperatures. In order to stably operate the liquid crystal optical shutter, the frequency of the RF electric field applied thereto must be sufficiently higher than the cross-over frequency.

The liquid crystal composition of the prior U.S. patent application requires a higher frequency of the RF electric field applied to the liquid crystal composition since the cross-over frequency is still high. When the frequency of the RF electric field is high, a large amount of RF current flows between opposite electrodes of the liquid crystal device through an equivalent capacitor. For this reason, much dielectric heat is generated. Further, Joule heat is generated by the resistances of the electrodes and the lead wires connected to these electrodes to apply the RF voltage thereto. When heated, the operating characteristics of the liquid crystal device are degraded. In addition, since a large amount of RF current flows, power consumption is undesirably increased. A complicated electronic circuit is required to generate a drive signal for applying the RF electric field. In this manner, a liquid crystal composition used in the liquid crystal device driven by the two-frequency addressing scheme must exhibit a typical dielectric dispersion phenomenon, respond at high speed at a relatively low voltage, and have a low cross-over frequency.

SUMMARY OF THE INVENTION

It is, therefore, an object of the present invention to provide a liquid crystal composition which can be driven by a two-frequency addressing scheme and which responds at high speed at a relatively low voltage and has a low cross-over frequency.

In order to achieve the above object of the present invention, a liquid crystal composition of the present invention has as its base a liquid crystal compound having a low viscosity and a high compatibility with other liquid crystal compounds and is prepared by mixing therewith a specific liquid crystal material containing at least one four-ring compound having four benzene rings and/or cyclohexane rings.

The liquid crystal composition according to the present invention contains a first liquid crystal material consisting of at least one compound selected from those represented by general formula (I):

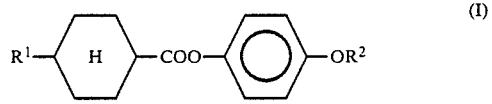

(wherein each of $R^1$ and $R^2$ is independently an alkyl group having 1 to 5 carbon atoms), and a second liquid crystal material consisting of at least one compound selected from those represented by general formula (II) to (VII) and including at least a compound represented by general formula (VII):

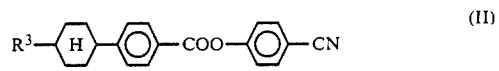

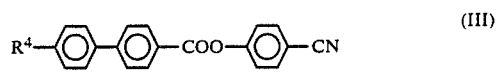

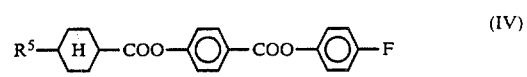

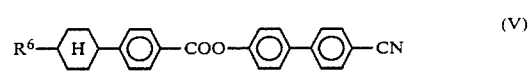

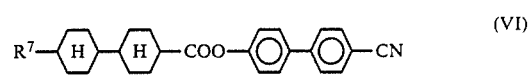

(wherein each of $R^3$, $R^4$, $R^5$, $R^6$, $R^7$, and $R^8$ is independently an alkyl group having 2 to 7 carbon atoms). The liquid crystal composition contains 45 to 70% by weight of the first liquid crystal material and 30 to 55% by weight of the second liquid crystal material containing 5 to 15% by weight of the compound represented by general formula (VII). The dielectric anisotropy of the resultant liquid crystal composition is positive in a low-frequency (e.g., 4 to 5 kHz) electric field and negative in an RF frequency (e.g., 100 to 300 kHz) electric field.

The liquid crystal composition prepared by mixing the specific compounds at the specific mixing ratio contains the four-ring compound having four benzene rings and/or cyclohexane rings. In particular, since the liquid crystal composition contains the compound represented by general formula (VII), it exhibits a typical dielectric dispersion phenomenon. The resultant composition has a large absolute value of dielectric anisotropy, a low viscosity, and a small elastic constant. Therefore, the composition has good response characteristics. In addition, the cross-over frequency is low. A liquid crystal device using this liquid crystal composition can be ON and/or OFF controlled at high speed. As described above, since the cross-over frequency is low, the frequency of the RF electric field can be reduced to 200 kHz or less (e.g., 150 kHz). The RF current is reduced to generate less heat. Therefore, the liquid crystal is not heated, and power consumption can be reduced. Because the RF electric field frequency is reduced, the arrangement of the electric circuit for driving the liquid crystal device can be simplified.

DESCRIPTION OF THE PREFERRED EMBODIMENTS

The present inventor made extensive studies to find a liquid crystal composition suitable for use in a liquid crystal device whose light transmission and shielding can be controlled, the liquid crystal composition having good response characteristics and a low cross-over frequency. The present inventor found that the prescribed object could be achieved by mixing a second liquid crystal material of at least a four-ring compound having an ester bond with a first liquid crystal material having a low viscosity and a high compatibility with other liquid crystal compounds. The four-ring compound has four benzene rings and/or cyclohexane rings, and an ester bond. In particular, an ester compound containing fluorobiphenyl is most preferred.

More specifically, the first liquid crystal material is a liquid crystal compound having a low viscosity (10 to 20 cP at 25° C.), good compatibility with other liquid crystal compounds, and a low $\Delta\epsilon(-1.0$ to $-1.5)$. Such a liquid crystal compound is represented by general formula (I):

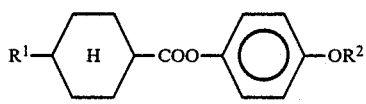     (I)

(wherein each of $R^1$ and $R^2$ is independently an alkyl group having 1 to 5 carbon atoms). One or more of the liquid crystal compounds represented by general formula (I) is used to provide the first liquid crystal material.

The second liquid crystal material of a liquid crystal compound exhibiting a dielectric dispersion property and having a large $\Delta\epsilon$ (+5 to +40) at a low frequency (fL) and a small $\Delta\epsilon$ (−0.5 to −2) at an RF frequency (fH) is mixed with the first liquid crystal material as the base. The second liquid crystal material imparts the dielectric dispersion property to the liquid crystal composition. The liquid crystal compound is a three-ring or four-ring compound having an ester bond and three or four benzene rings and/or cyclohexane rings. Such liquid crystal compounds can be represented by the general formulas below:

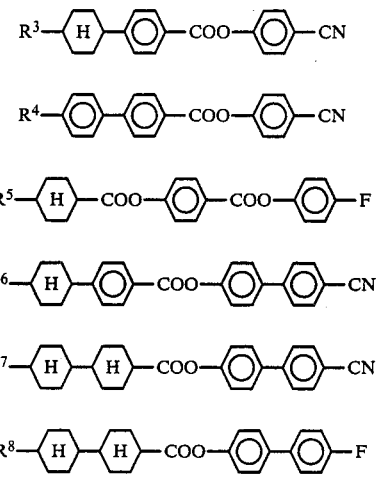

(wherein each of $R^3$, $R^4$, $R^5$, $R^6$, $R^7$, and $R^8$ is independently an alkyl group having 2 to 7 carbon atoms). Among the liquid crystal compounds represented by general formulas (II) to (VII), the four-ring compounds represented by general formulas (V), (VI), and (VII) are effective for reducing the cross frequencies of the liquid crystal compositions. In particular, the four-ring liquid crystal compound represented by general formula (VII) exhibits a typical effect for reducing the cross-over frequency. The liquid crystal composition according to the present invention includes at least one liquid crystal compound represented by general formula (VII). Preferably, the second liquid crystal material includes at least one four-ring liquid crystal compound represented by general formulas (V) and (VI) and/or at least one liquid crystal compound represented by general formulas (II) to (IV), in addition to the liquid crystal compound represented by general formula (VII). In particular, the second liquid crystal material preferably contains one or both of the liquid crystal compounds represented by general formulas (V) and (VI), in addition to the compound of formula (VII).

The liquid crystal composition according to the present invention contains 45 to 70% by weight of the first liquid crystal material and 30 to 55% by weight of the second liquid crystal material with respect to the total content of the resultant liquid crystal composition. In this case, the liquid crystal compound represented by general formula (VII) is preferably contained in an amount of 5 to 15% by weight.

In order to obtain better characteristics, a third liquid crystal material is mixed to reduce the dielectric anisotropy of the liquid crystal composition in the negative direction and, at the same time, to reduce the cross-over frequency. In order to increase the absolute value of $\Delta\epsilon$ in the RF electric field, a liquid crystal compound having a large negative $\Delta\epsilon$ (about −20) is used. This compound can be represented by the following general formula:

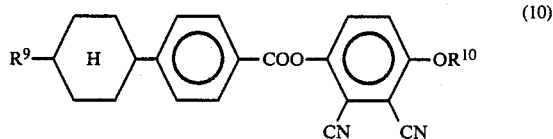     (10)

(wherein each of $R^9$ and $R^{10}$ is independently an alkyl group having 2 to 5 carbon atoms). The content of the third liquid crystal material falls within the range of 15% by weight or less, as needed, and preferably 2 to 15% by weight.

The liquid crystal composition constituted by the above liquid crystal materials preferably contains the following amount of the second liquid crystal material. If the second liquid crystal material contains at least one liquid crystal compound represented by general formulas (V) and (VI), an optimal total content of such a compound and the compound represented by general formula (VII) is preferably 5 to 40% by weight. In particular, the content of at least one liquid crystal compound represented by general formula (V) is preferably 2 to 20% by weight, and the content of at least one liquid crystal compound represented by general formula (VI) is preferably 2 to 15% by weight. If the second liquid crystal material contains both the liquid crystal compounds represented by general formulas (V) and (VI), respectively, a total content of the compounds represented by general formulas (V), (VI) and (VII) are preferably 30 to 40% by weight.

The second liquid crystal material preferably contains at least one liquid crystal compound represented by general formulas (V) and (VI) or both liquid crystal compounds represented by general formulas (II) and (III), respectively, in addition to the liquid crystal compound represented by general formula (VII). If the second liquid crystal material contains at least one of the liquid crystal compounds represented by general formulas (V) and (VI), a total content of the liquid crystal compound represented by general formula (V) and/or (VI) is preferably 5 to 35% by weight. If the second liquid crystal material contains the liquid crystal compounds represented by general formulas (II) and (III), the contents of the liquid crystal compounds represented by general formulas (II) and (III) are preferably 5 to 20% by weight and 5 to 15% by weight, respectively. In addition, a liquid crystal compound represented by general formula (IV) is preferably contained in an amount of 2 to 15% by weight.

Furthermore, the second liquid crystal material preferably contains both liquid crystal compounds represented by general formulas (II) and (III), respectively, and one of the liquid crystal compounds represented by general formulas (V) and (VI), in addition to the liquid crystal compound represented by general formula (VII). In this case, the contents of the liquid crystal compounds represented by general formulas (II), (III), (V), and (VI) are preferably 5 to 20% by weight, 5 to 15% by weight, 2 to 20% by weight, and 5 to 15% by weight, respectively.

The contents of the second liquid crystal material should be selected such that a total content thereof falls within the range of 30 to 55% by weight of the resultant liquid crystal composition, as noted above.

In the liquid crystal compounds represented by general formulas (I) to (VIII), $R^1$ in general formula (I) is preferably a propyl, butyl, or penthyl group, $R^2$ is preferably a methyl, ethyl, or butyl group; $R^3$ in general formula (II) is preferably an ethyl or pentyl group; $R^4$ in general formula (III) is preferably a pentyl or heptyl group; $R^5$ in general formula (IV) is preferably a propyl group; $R^6$ in general formula (V) is preferably a propyl or pentyl group; $R^7$ in general formula (VI) is preferably a propyl or pentyl group; $R^8$ in general formula (VII) is preferably a propyl or pentyl group; and each of $R^9$ and $R^{10}$ in general formula (VIII) is independently an ethyl, propyl, or butyl group.

The present invention will be described in detail by way of examples.

EXAMPLES

Liquid crystal compounds in Tables 1 and 2 were mixed in the indicated mixing ratios to prepare seven liquid crystal compositions. Using these liquid crystal compositions, liquid crystal cells were prepared and driven at the two different frequencies of 200 Hz and 100 kHz and at a voltage of 25 V. The values of dielectric anisotropy $\Delta\epsilon$ and cross-over frequencies fc of these compositions were measured and summarized in Table 3. Viscosities (at a measuring temperature of 25° C.) of the liquid crystal compositions are also shown in Table 3. The rise and fall times of the liquid crystal compositions were 0.5 msec or less. None of these compositions were frozen in a 0° C. freezer after they were left therein for 4 days (C-N point of 0° C. or less).

TABLE 1

| | Liquid Crystal Compound | Example (% by weight) | | |
|---|---|---|---|---|
| | | 1 | 2 | 3 |
| First Liquid Crystal Material | | | | |
| 1 | 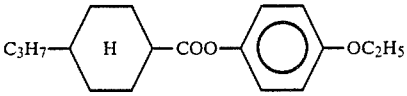 | 7 | 7.3 | 9.1 |
| 2 | 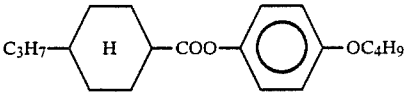 | 8 | 8.3 | 10.4 |
| 3 | 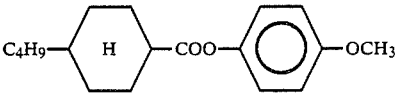 | 7 | 7.3 | 9.1 |
| 4 | 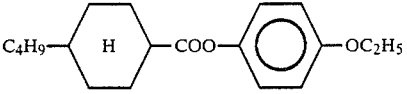 | 8 | 8.3 | 10.4 |
| 5 | 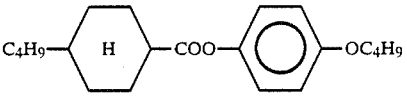 | 7 | 7.3 | 9.1 |
| 6 | 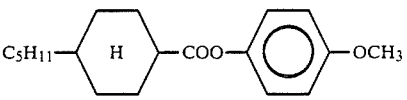 | 8 | 8.3 | 10.4 |
| 7 | 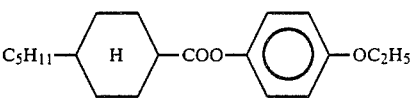 | 5 | 5.2 | 6.5 |
| Second Liquid Crystal Material | | | | |

TABLE 1-continued

| | Liquid Crystal Compound | Example (% by weight) 1 | 2 | 3 |
|---|---|---|---|---|
| 8 | C₂H₅–(H)–⬡–COO–⬡–CN | 8 | 8 | |
| 9 | C₅H₁₁–(H)–⬡–COO–⬡–CN | 7 | 7 | |
| 10 | C₅H₁₁–⬡–⬡–COO–⬡–CN | 5 | 5 | |
| 11 | C₇H₁₅–⬡–⬡–COO–⬡–CN | 5 | 5 | |
| 12 | C₅H₇–(H)–COO–⬡–COO–⬡–F | 7 | | |
| 13 | C₃H₇–(H)–⬡–COO–⬡–⬡–CN | | | 8 |
| 14 | C₅H₁₁–(H)–⬡–COO–⬡–⬡–CN | | | 7 |
| 15 | C₃H₇–(H)–(H)–COO–⬡–⬡–CN | | 3 | 5 |
| 16 | C₅H₁₁–(H)–(H)–COO–⬡–⬡–CN | | 2 | 5 |
| 17 | C₃H₇–(H)–(H)–COO–⬡–⬡–F | 5 | 5 | 5 |
| 18 | C₅H₁₁–(H)–(H)–COO–⬡–⬡–F | 5 | 5 | 5 |

Third Liquid Crystal Material

| | | | | |
|---|---|---|---|---|
| 19 | C₄H₉–(H)–⬡–COO–⬡(CN)(CN)–OC₄H₉ | 2 | 2 | |

TABLE 1-continued

| | Liquid Crystal Compound | Example (% by weight) | | |
|---|---|---|---|---|
| | | 1 | 2 | 3 |
| 20 | C$_3$H$_7$—[H]—[◯]—COO—[◯(CN)(CN)]—OC$_2$H$_5$ | | 3 | 3 |
| 21 | C$_2$H$_5$—[H]—[◯]—COO—[◯(CN)(CN)]—OC$_3$H$_7$ | | 3 | 3 |

TABLE 2

| | Liquid Crystal Compound | Example (% by weight) | | | |
|---|---|---|---|---|---|
| | | 4 | 5 | 6 | 7 |
| First Liquid Crystal Material | | | | | |
| 1 | C$_3$H$_7$—[H]—COO—[◯]—OC$_2$H$_5$ | 7 | 6.7 | 7.3 | 7.7 |
| 2 | C$_3$H$_7$—[H]—COO—[◯]—OC$_4$H$_9$ | 8 | 7.7 | 8.3 | 8.8 |
| 3 | C$_4$H$_9$—[H]—COO—[◯]—OCH$_3$ | 7 | 6.7 | 7.3 | 7.7 |
| 4 | C$_4$H$_9$—[H]—COO—[◯]—OC$_2$H$_5$ | 8 | 7.7 | 8.3 | 8.8 |
| 5 | C$_4$H$_9$—[H]—COO—[◯]—OC$_4$H$_9$ | 7 | 6.7 | 7.3 | 7.7 |
| 6 | C$_5$H$_{11}$—[H]—COO—[◯]—OCH$_3$ | 8 | 7.7 | 8.3 | 8.8 |
| 7 | C$_5$H$_{11}$—[H]—COO—[◯]—OC$_2$H$_5$ | 5 | 4.8 | 5.2 | 5.5 |
| Second Liquid Crystal Material | | | | | |
| 8 | C$_2$H$_5$—[H]—[◯]—COO—[◯]—CN | 8 | 8 | | 5 |
| 9 | C$_5$H$_{11}$—[H]—[◯]—COO—[◯]—CN | 7 | 7 | 15 | 5 |

TABLE 2-continued

| | Liquid Crystal Compound | Example (% by weight) | | | |
|---|---|---|---|---|---|
| | | 4 | 5 | 6 | 7 |
| 10 | $C_5H_{11}$–⟨Ph⟩–⟨Ph⟩–COO–⟨Ph⟩–CN | 5 | 7 | 3 | 6 |
| 11 | $C_7H_{15}$–⟨Ph⟩–⟨Ph⟩–COO–⟨Ph⟩–CN | 5 | 3 | 7 | 6 |
| 12 | $C_3H_7$–⟨H⟩–COO–⟨Ph⟩–COO–⟨Ph⟩–F | | | | |
| 13 | $C_3H_7$–⟨H⟩–⟨Ph⟩–COO–⟨Ph⟩–⟨Ph⟩–CN | 4 | 3 | | |
| 14 | $C_5H_{11}$–⟨H⟩–⟨Ph⟩–COO–⟨Ph⟩–⟨Ph⟩–CN | 3 | 5 | 5 | |
| 15 | $C_3H_7$–⟨H⟩–⟨H⟩–COO–⟨Ph⟩–⟨Ph⟩–CN | | | | 3 |
| 16 | $C_5H_{11}$–⟨H⟩–⟨H⟩–COO–⟨Ph⟩–⟨Ph⟩–CN | | | | 2 |
| 17 | $C_3H_7$–⟨H⟩–⟨H⟩–COO–⟨Ph⟩–⟨Ph⟩–F | 5 | 5 | 3 | 5 |
| 18 | $C_5H_{11}$–⟨H⟩–⟨H⟩–COO–⟨Ph⟩–⟨Ph⟩–F | 5 | 5 | 7 | 5 |
| Third Liquid Crystal Material | | | | | |
| 19 | $C_4H_9$–⟨H⟩–⟨Ph⟩–COO–⟨Ph(CN)(CN)⟩–$OC_4H_9$ | 2 | 3 | 2 | 2 |
| 20 | $C_3H_7$–⟨H⟩–⟨Ph⟩–COO–⟨Ph(CN)(CN)⟩–$OC_2H_5$ | 3 | 3 | 3 | 3 |
| 21 | $C_2H_5$–⟨H⟩–⟨Ph⟩–COO–⟨Ph(CN)(CN)⟩–$OC_3H_7$ | 3 | 3 | 3 | 3 |

TABLE 3

| Physical Property | Example | | | | | | |
|---|---|---|---|---|---|---|---|
| | 1 | 2 | 3 | 4 | 5 | 6 | 7 |
| Δε (200 Hz) | 6.7 | 6.7 | 4.2 | 6.9 | 6.6 | 5.9 | 5.8 |
| Δε (100 kHz) | −3.4 | −3.3 | −1.5 | −3.3 | −3.5 | −3.4 | −3.1 |
| fc | 10.2 kHz (25° C.) | 10.0 kHz (25° C.) | 0.9 kHz (25° C.) | 7.2 kHz (23° C.) | 6.0 kHz (23° C.) | 6.6 kHz (24° C.) | 9.2 kHz (23° C.) |
| Viscosity (25° C.) | 96 cp | 96 cp | 44 cp | 110 cp | 85 cp (30° C.) | 100 cp | 87 cp |

In the composition of Example 1, the second liquid crystal material was prepared by mixing three-ring liquid crystal compounds represented by general formulas (II), (III), and (IV), in addition to the four-ring liquid crystal compound represented by general formula (VII). The cross-over frequency of the resultant liquid crystal composition can be reduced by mixing the four-ring liquid crystal compound represented by general formula (VII).

In the compositions of Examples 2 and 7, the second liquid crystal materials were prepared by mixing the liquid crystal compounds represented by general formulas (VI) and (VII) with the four-ring compounds, respectively. Since the contents of four-ring compounds are increased, the cross-over frequencies of the resultant compositions are further reduced as compared with the composition of Example 1.

In the composition of Example 3, the second liquid crystal material was prepared by only the four-ring crystal compounds represented by general formulas (V), (VI), and (VII). In this manner, since the contents of the four-ring compounds are increased, the cross-over frequency of the resultant composition can be very low.

In the compositions of Examples 4, 5, and 6, the second liquid crystal materials were prepared by mixing the liquid crystal compounds represented by general formula (V) in addition to the liquid crystal compound represented by general formula (VII). Therefore, the cross-over frequency of each resultant composition can be reduced.

The liquid crystal compositions of Examples 1 to 7 exhibit a typical dielectric dispersion phenomenon. The absolute values of dielectric anisotropy of these compositions are large, and elastic constants thereof are small. These compositions are suitable for high-speed response. In addition, the use of four-ring compounds causes a reduction of cross-over frequencies, thus reducing the frequency of the RF electric field applied according to two-frequency addressing scheme. Therefore, heat generation of the liquid crystal device can be prevented, and power consumption can be reduced.

Liquid crystal devices using the above liquid crystal compositions are arranged in the following manner. In each device, a pair of substrates having electrodes are spaced apart from each other by about 4.5 to 5.5 μm such that the electrode surfaces oppose each other, and the liquid crystal composition is sealed therebetween. A low-frequency (4 to 5 kHz) electric field and an RF (200 kHz) electric field are selectively applied to the liquid crystal device to control the light-transmitting and light-shielding states. Since the liquid crystal device using the liquid crystal composition of the present invention has a low cross-over frequency, the device can be driven by an electric field having a relatively low frequency of 320 kHz and preferably 200 kHz or less. In addition, the absolute value of dielectric anisotropy is large, the viscosity is low, and the elastic constant is small. Therefore, the light-transmitting and light-shielding states can be controlled at high speed.

What is claimed is:

1. A liquid crystal composition comprising:
   a first liquid crystal material consisting of at least one compound selected from those represented by general formula (I):

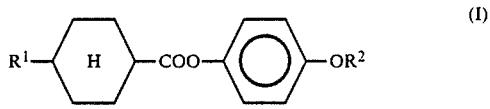

(wherein each of $R^1$ and $R^2$ is independently an alkyl group having 1 to 5 carbon atoms); and
   a second liquid crystal material consisting of at least one compound represented by general formula (VII) among compounds represented by general formulas (II) to (VII):

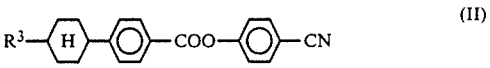

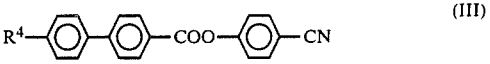

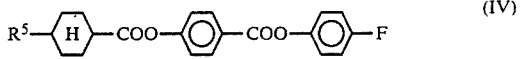

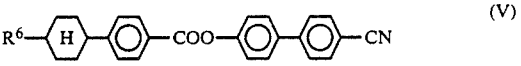

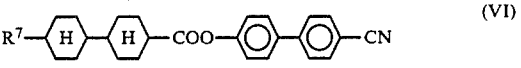

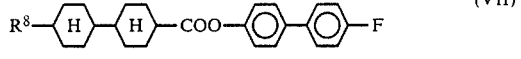

(wherein each of $R^3$, $R^4$, $R^5$, $R^6$, $R^7$, and $R^8$ is independently an alkyl group having 2 to 7 carbon atoms), said first liquid crystal material having a content of 45 to 70% by weight and said second liquid crystal material having a content of 30 to 55% by weight, said second liquid crystal material containing 5 to 15% by weight of a compound represented by general formula (VII) said liquid crystal composition having a positive value of dielectric anisotropy in a low-frequency electric field and a negative value of dielectric anisotropy in a high-frequency electric field.

2. A composition according to claim 1, wherein said second liquid crystal material is a mixture containing at least one of the compounds represented by general formulas (V) and (VI), in addition to the compound of formula (VII).

3. A composition according to claim 2, wherein a total content of at least one compound represented by general formula (V), at least one compound represented by general formula (VI), and at least one compound represented by general formula (VII) is 5 to 40% by weight.

4. A composition according to claim 1, wherein said second liquid crystal material contains 2 to 20% by weight of the compound represented by general formula (V) and 2 to 15% by weight of said compound represented by general formula (VI).

5. A composition according to claim 1, wherein said second liquid crystal material contains a mixture of the compounds represented by general formulas (II) and (III) or at least one of the compounds represented by general formulas (V) and (VI), the compound represented by general formula (II) having a content of 5 to 20% by weight, the compound represented by general formula (III) having a content of 5 to 15% by weight, the compound represented by general formula (V) having a content of 2 to 20 % by weight, and the compound represented by general formula (VI) having a content of 2 to 15% by weight.

6. A composition according to claim 3, wherein a total content of at least one compound represented by general formula (V) and at least one compound represented by general formula (VI) is 5 to 30% by weight.

7. A composition according to claim 5, wherein said second liquid crystal material contains the compounds represented by general formulas (II) and (III), and further contains 2 to 15% by weight of a third liquid crystal material comprising at least one of compounds represented by the following general formula:

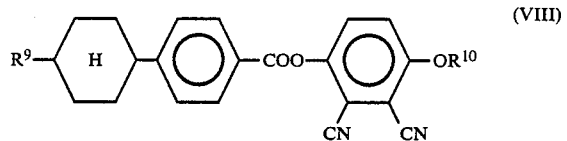
(VIII)

(wherein each of $R^9$ and $R^{10}$ is independently an alkyl group having 2 to 5 carbon atoms) with respect to a total content of said liquid crystal composition.

8. A composition according to claim 7, wherein said second liquid crystal material contains 2 to 15% by weight of at least one compound represented by general formula (IV).

9. A composition according to claim 1, wherein said second liquid crystal material contains said compounds represented by general formulas (II), (III), and (V) or (VI), the compounds represented by general formulas (II), (III), (V), and (VI) having contents of 5 to 20% by weight, 5 to 15% by weight, 2 to 20% by weight, and 2 to 15% by weight, respectively.

10. A composition according to claim 9, wherein said second liquid crystal material contains the compounds represented by general formulas (II), (III), and (V).

11. A composition according to claim 10, further containing a third liquid crystal material consisting of 2 to 15% by weight of at least one compound represented by the following general formula:

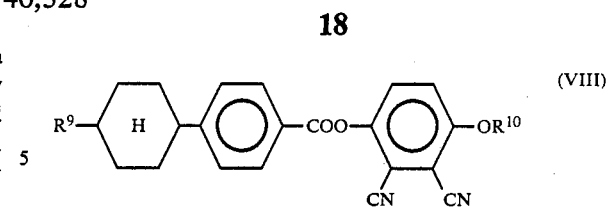
(VIII)

(wherein each of $R^9$ and $R^{10}$ is independently an alkyl group having 2 to 5 carbon atoms).

12. A composition according to claim 9, wherein said second liquid crystal material contains said compounds respectively represented by general formulas (II), (III), and (VI).

13. A composition according to claim 12, further containing a third liquid crystal material consisting of 2 to 15% by weight of at least one compound represented by the following general formula:

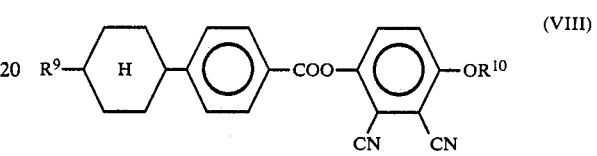
(VIII)

(wherein each of $R^9$ and $R^{10}$ is independently an alkyl group having 2 to 5 carbon atoms).

14. A composition according to claim 1, wherein said second liquid crystal material contains at least one compound represented by general formula (II), at least one compound represented by general formula (III), and at least one of the compounds represented by general formulas (V) and (VI), said compounds represented by general formulas (II), (III), (V), and (VI) having contents of 5 to 20% by weight, 5 to 15% by weight, 2 to 20% by weight, and 2 to 15% by weight, respectively; and further containing a third liquid crystal material comprising not more than 15% by weight of at least one compound represented by the following general formula:

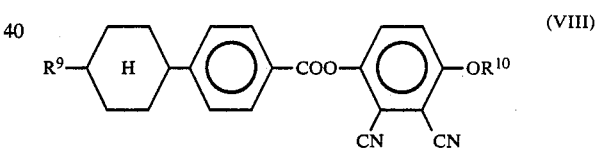
(VIII)

(wherein each of $R^9$ and $R^{10}$ is independently an alkyl group having 2 to 5 carbon atoms).

15. A composition according to claim 14, wherein said second liquid crystal material contains at least one compound represented by general formula (II), at least one compound represented by general formula (III), and at least one compound represented by general formula (V).

16. A composition according to claim 14, wherein said second liquid crystal material contains at least one compound represented by general formula (II), at least one compound represented by general formula (III), and at least one compound represented by general formula (VI).

17. A composition according to claim 14, wherein $R^1$ is a propyl group, a butyl group, or a pentyl group, and $R^2$ is a methyl group, an ethyl group, or a butyl group.

18. A composition according to claim 14, wherein in the compounds represented by general formulas (V), (VI), and (VII) in said second liquid crystal material, each of $R^6$, $R^7$, and $R^8$ is independently a propyl group or a pentyl group.

19. A composition according to claim 14, wherein $R^9$ is an ethyl group, a propyl group, or a butyl group, and $R^{10}$ is an ethyl group, a propyl group, or a butyl group.

* * * * *